US005673652A

United States Patent [19]
Witte

[11] Patent Number: 5,673,652
[45] Date of Patent: Oct. 7, 1997

[54] CAT TOY AND METHOD OF MANUFACTURE

[76] Inventor: Lawrence E. Witte, 540 Laurel Ter., York, Pa. 17406

[21] Appl. No.: 549,239

[22] Filed: Oct. 27, 1995

[51] Int. Cl.$^6$ .................................................. A01K 29/00
[52] U.S. Cl. .................................................. 119/707
[58] Field of Search .................... 119/702, 707, 119/709, 710, 711, 706, 281; 446/109, 110, 111, 112; 273/166, 170, 171

[56] References Cited

U.S. PATENT DOCUMENTS

| | | | |
|---|---|---|---|
| 489,394 | 1/1893 | Spencer | 273/109 |
| 797,105 | 8/1905 | Graves | 273/110 |
| 1,522,307 | 1/1925 | Lewis | 273/110 |
| 4,771,732 | 9/1988 | Carney | 119/711 |
| 5,269,261 | 12/1993 | McCance | 119/707 |
| 5,390,629 | 2/1995 | Simone | 119/711 |
| 5,544,623 | 8/1996 | Udelle et al. | 446/170 X |

*Primary Examiner*—Thomas Price
*Attorney, Agent, or Firm*—Aquilino & Welsh

[57] ABSTRACT

A cat toy including a housing having an opening permitting a cat to reach within the housing, wherein the housing is formed from a single piece of material that is originally a flat form that is folded into the final housing configuration. The toy further includes at least one amusement device retained within the housing.

16 Claims, 5 Drawing Sheets

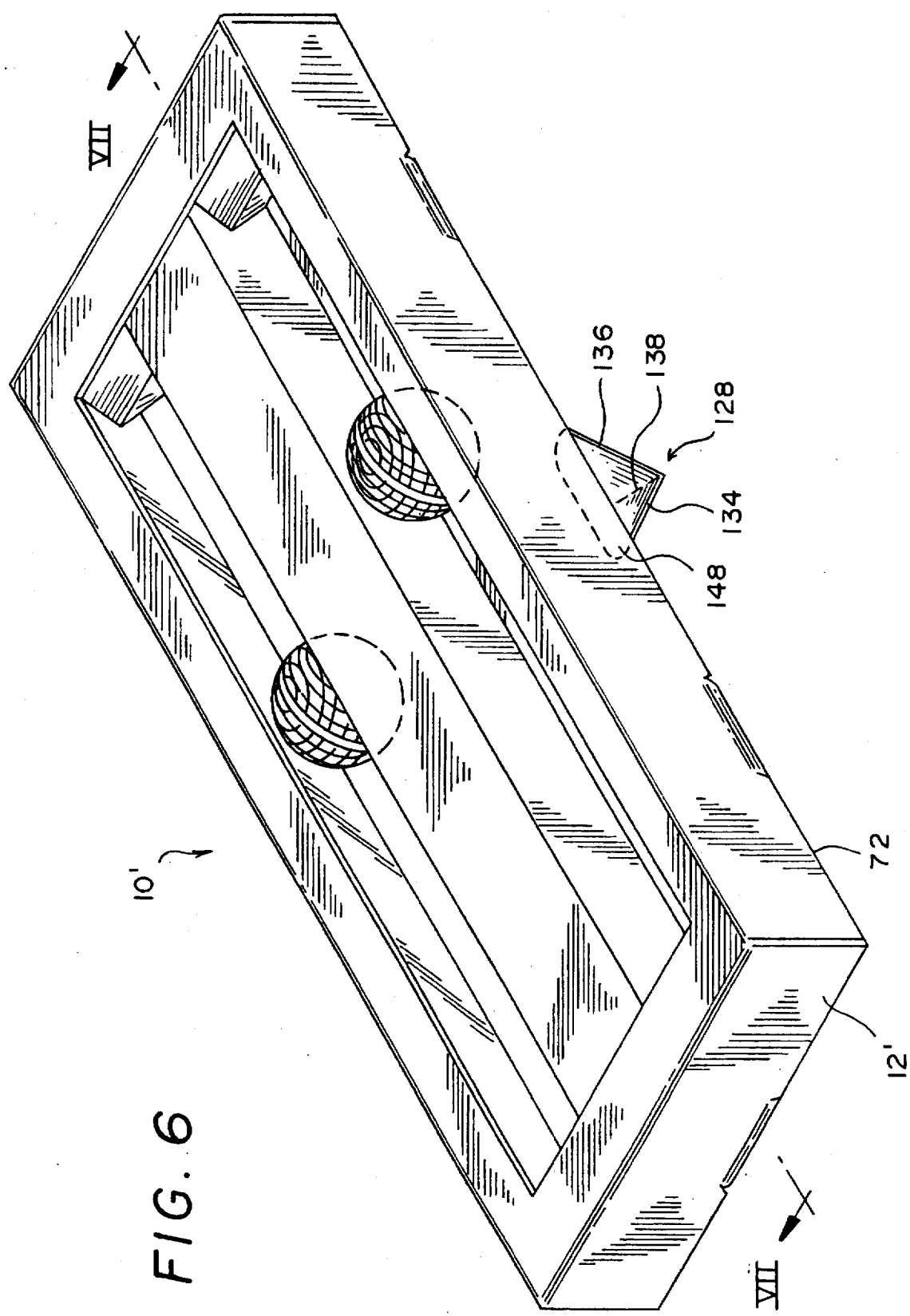

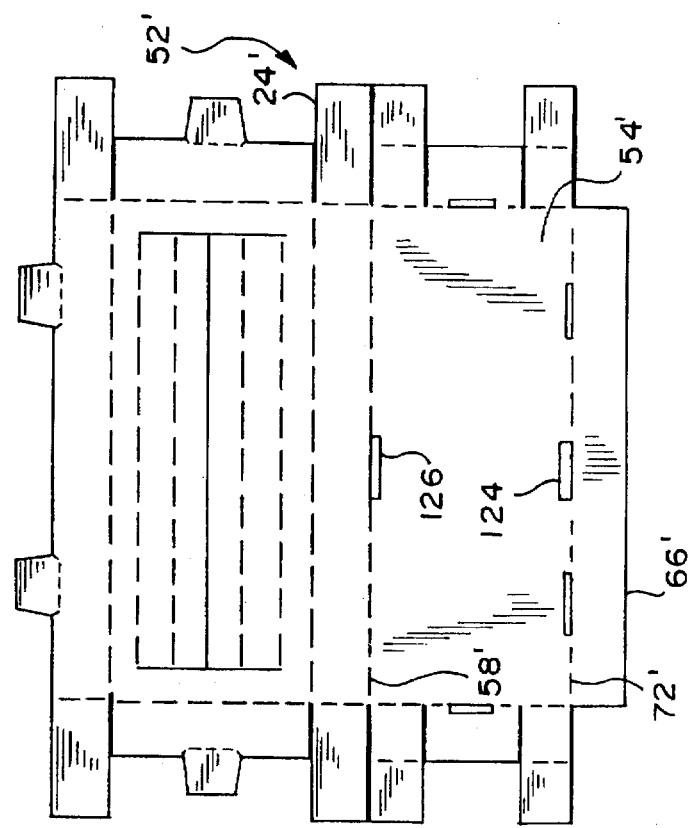
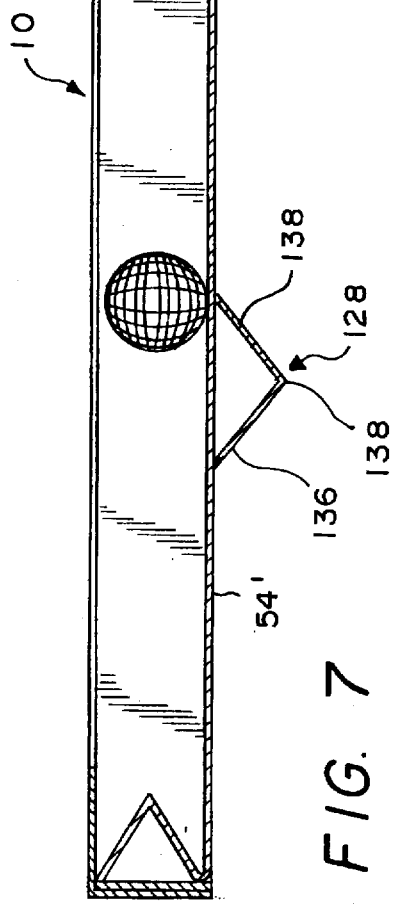
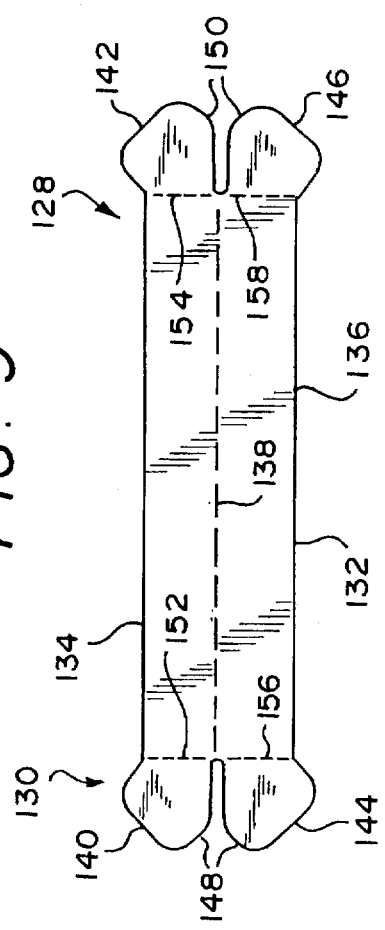
FIG. 8
FIG. 7
FIG. 9

5,673,652

CAT TOY AND METHOD OF MANUFACTURE

BACKGROUND OF THE INVENTION

1. Field of the Invention

The present invention relates to cat toys. More particularly, the invention relates to cat toys constructed from a corrugated cardboard and a method for making cat toys.

2. Description of the Prior Art

Toys are often invaluable to owners of cats. Toys provide a diversion for the cats, as well as entertainment for the cat owners who may watch their cat in action. More importantly, toys provide cats with a plaything so they do not destroy other household items.

In addition to toys, cats require a rough surface upon which they can scratch their claws. If a cat is not provided with a suitable surface for scratching, he or she may resort to using household items to relieve the need to scratch. For example, cats have been known to shred a variety of items, including, carpeting, drapes, and fabric covered furniture.

Many cat toys are currently available, and many of these toys incorporate a variety diversions within a single apparatus. For example, U.S. Pat. No. 5,269,261 and U.S. Pat. No. Des. 345,633, to McCance, disclose a combined animal scratching pad and toy. The device includes a circular track 12 for containing a ball therein and a centrally located scratch pad 14 positioned in the center of the circular track. The track is manufactured from plastic and necessarily requires expensive molding and other processing. Additionally, U.S. Pat. No. Des. 348,124, to O'Rourke et al., discloses a play toy for cats. The toy appears to include a centrally located circular track and a pyramid-shaped climbing structure.

The toys disclosed by McCance and O'Rourke et al. are apparently manufactured from plastic. Therefore, these toys are relatively expensive, since expensive molding equipment must be prepared before an individual is able to make these toys. Additionally, plastic is general not biodegradable and the toys necessarily add to our garbage problem once the cat grows bored with the toy.

While, neither of the cat toys disclosed by McCance and O'Rourke et al. disclose toys manufactured from cardboard, Great Britain Patent No. 968,012 discloses a cat scratch pad contained within a cardboard box. However, the Great Britain patent does not provide a toy for the cat, and is limited to the provision of a scratch pad for the cat.

After studying the prior art, it is apparent that a need exists for a multipurpose cat toy which is inexpensive to manufacture. Additionally, a need exists for a cat toy which is substantially biodegradable once it is no longer useful. The present invention provides such a cat toy.

SUMMARY OF THE INVENTION

It is, therefore, an object of the present invention to provide a cat toy including a housing having an opening permitting a cat to reach within the housing. The scratch pad is positioned within the housing to create at least one longitudinally extending track and at least one ball is retained within the one track.

It is also an object of the present invention to provide a cat toy including a housing having an opening permitting a cat to reach within the housing, wherein the housing is formed from a single piece of material that is originally a flat form and is folded into the final housing configuration. The toy further includes at least one amusement device retained within the housing.

A further object of the present invention is the provision of a method for making a cat toy. The method is accomplished by creating a form from a single piece of material, folding the form to create a housing having an opening permitting a cat to reach within the housing, and positioning a cat amusement device within the housing.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a cross sectional view along III—III of FIG. 1.

FIG. 6 is a perspective view of an alternate embodiment of the cat.

FIG. 7 is a cross sectional view along VII—VII of FIG. 6.

FIG. 8 is a perspective view of the form for the embodiment shown in FIG. 6.

FIG. 9 is a perspective view of the form for the rocker member.

DESCRIPTION OF THE PREFERRED EMBODIMENT

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
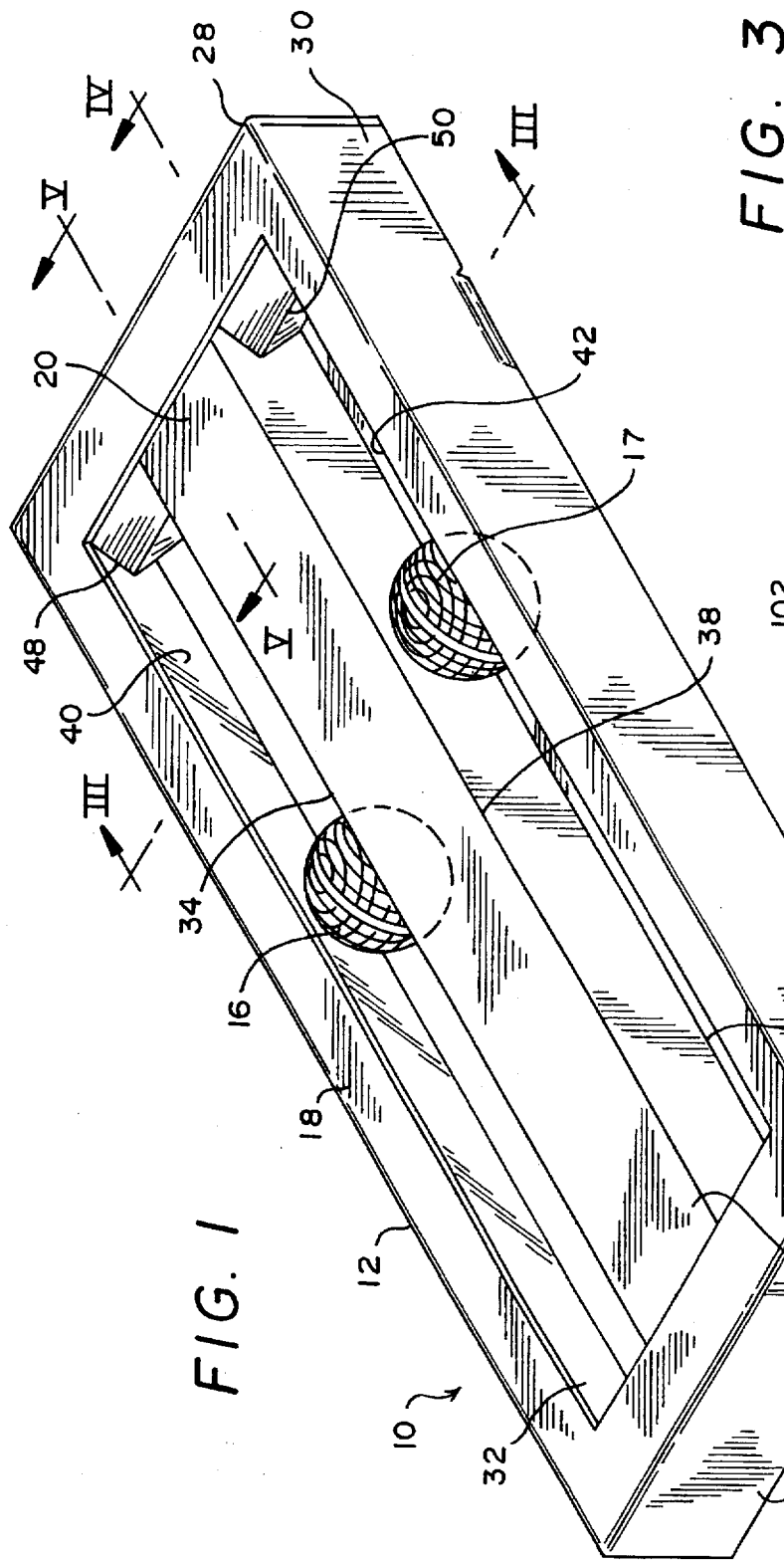
FIG. 1 is a perspective view of the cat toy.

With reference to FIG. 1, the present cat toy 10 is disclosed. The cat toy 10 includes a housing 12 dimensioned to retain a centrally located scratch pad 14 and a pair of play balls 16, 17. The scratch pad 14 is parallelogram shaped and is preferably rectangular, although other shapes could be employed without departing from the spirit of the present invention. The housing 12 includes a top 18 having a central opening 20 therein. The central opening 20 exposes the scratch pad 14 and the play balls 16, 17 to a cat. The housing 12 further includes a base 22, a first side portion 24, a second side portion 26, a third side portion 28 and a fourth side portion 30.

The scratch pad 14 is centrally positioned within the housing 12 to create a first track 32 between the first edge 34 of the scratch pad 14 and the first side portion 24 and a second track 36 between the second edge 38 of the scratch pad 14 and the fourth side portion 30. The first ball 16 is retained within the first track 32 by the first edge 34 of the scratch pad 14 and a first inwardly extending lip 40 adjacent the central opening 20 and the second ball 17 is retained within the second track 36 by the second edge 38 of the scratch pad 14 and a second inwardly extending lip 42 adjacent the central opening 20. The balls 16, 17 are prevented from becoming caught under the top 18 of the housing 12 by first and second abutments 44, 46 positioned at the ends of the first and second tracks 32, 34 adjacent the second side portion 26 and first and second abutments 48, 50 positioned at the ends of the first and second tracks 32, 34 adjacent the third side portion 28.

Figure 2:
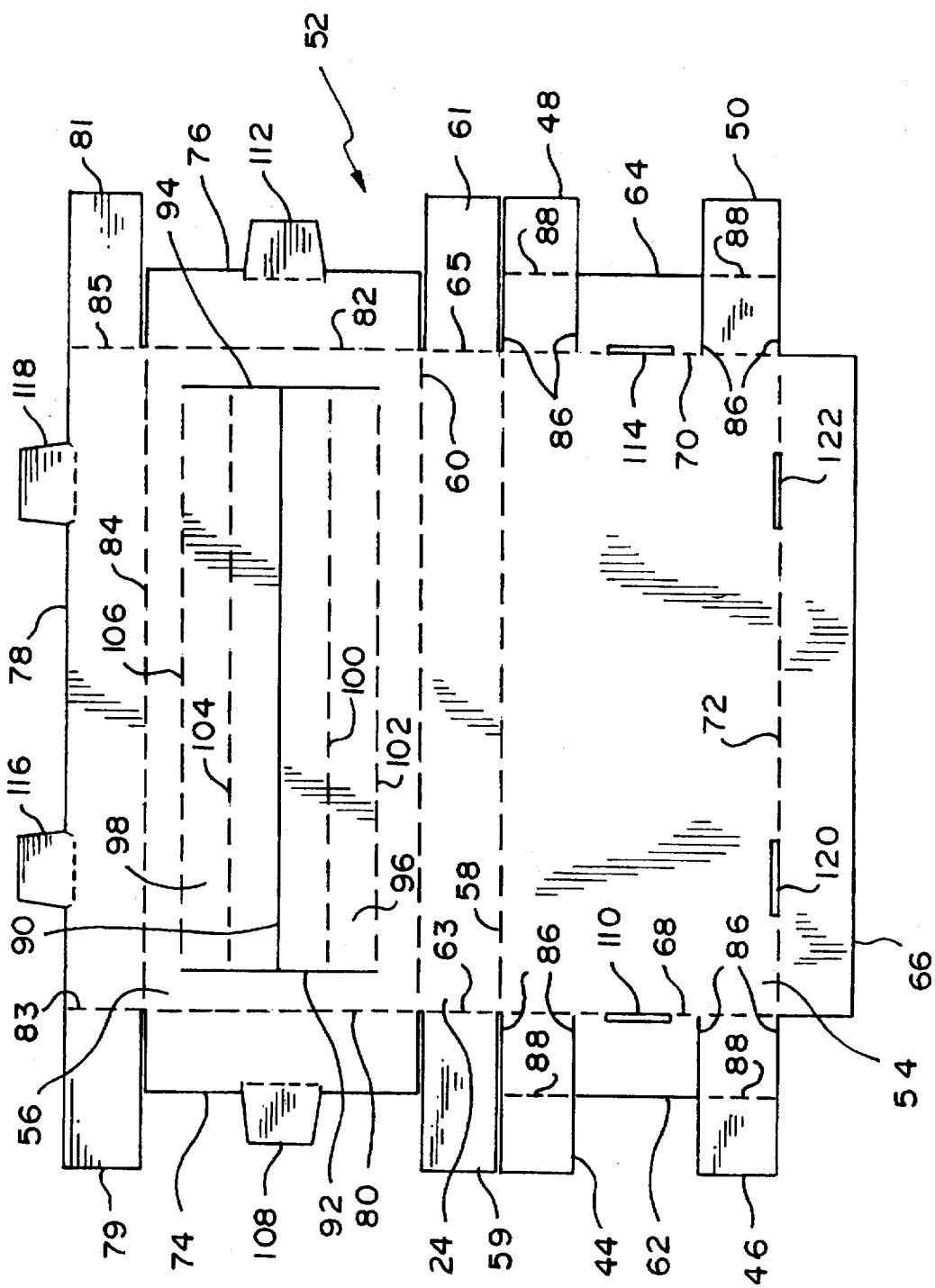
FIG. 2 is a perspective view of the form for the present cat toy.
Figure 4:
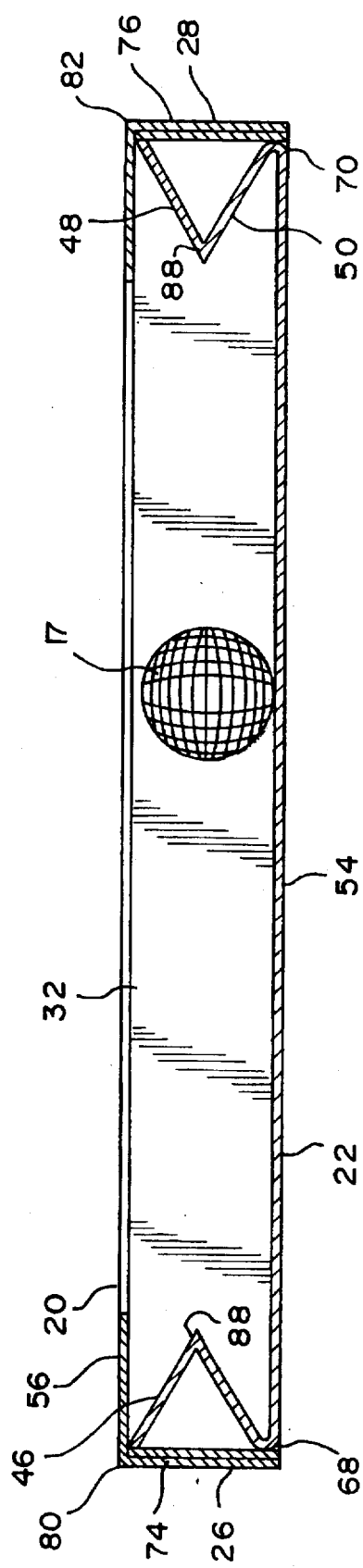
FIG. 4 is a cross sectional view along IV—IV of FIG. 1.
Figure 5:
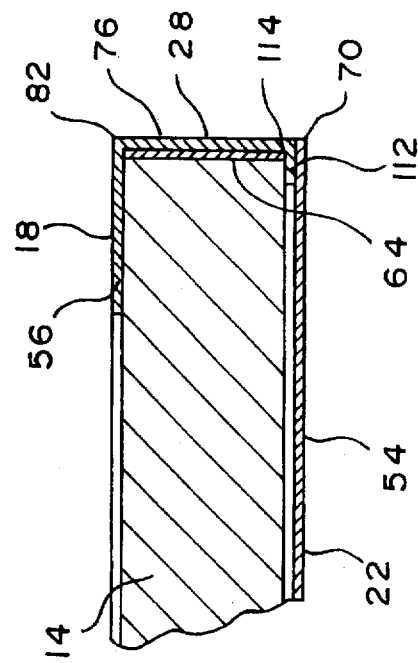
FIG. 5 is a cross sectional view along V—V of FIG. 1.

The housing 12 is made from a form 52 consisting of a single piece of flexible biodegradable material. Preferably, the housing 12 is made from a single piece of cardboard, although other like materials could be used without departing from the spirit of the invention. With reference to FIG. 2, the form 52 is shown in its unfolded condition. The housing 12 is constructed from the form 52 by folding the form 52 in the following manner.

As shown in FIG. 2, the form 52 includes a first section 54 which forms the base 22 of the housing 12 and a second section 56 which forms the top 18 of the housing 12. A first side portion 24 is connected between the first section 54 and the second section 56. The first side portion 24 is connected to the first section 54 and the second section 56 by first and second fold lines 58, 60, respectively. The first side portion includes flaps 59 and 61 at opposite ends thereof. The flaps 59, 61 respectively include fold lines 63, 65 permitting the flaps 59, 61 to fold when the housing is assembled.

Additionally, the first section 54 is connected to a first outwardly extending base member 62, a second outwardly extending base member 64, and a third outwardly extending base member 66 along the edges of the first section 54. The first, second and third outwardly extending base members are respectively connected to the first section 54 by a first fold line 68, a second fold line 70 and a third fold line 72. The third outwardly extending base member 66 includes flaps 67 and 69 secured at opposite ends thereof. The flaps 67, 69 respectively include fold lines 71 and 73 permitting flaps 67, 69 to fold when the housing is assembled.

Similarly, the second section 56 is connected to a first outwardly extending top member 74, a second outwardly extending top member 76, and a third outwardly extending top member 78 extending along the edges of the second section 56. The first, second and third outwardly extending top members are respectively connected to the second section 56 by a first fold line 80, a second fold line 82, and a third fold line 84. The outwardly extending base members correspond to the outwardly extending top members, and form the second side portion 26, the third side portion 28 and the fourth side portion 30 in a manner that will be discussed in greater detail below.

Assembly of the cat toy will now be discussed in greater detail. The form 52 is first laid on a flat surface. Next, the first outwardly extending base member 62 and the second outwardly extending base member 64 are respectively folded upwardly along the first fold line 68 and the second fold line 70. The first outwardly extending base member 62 includes first and second abutments 44, 46 and the second outwardly extending base member 64 similarly includes first and second abutments 48, 50. The abutments are spaced to permit the scratch pad 14 to be placed between the abutments in a manner that will be discussed in a greater detail below. The abutments are formed in the first and second outwardly extending base members 62, 64 by breaking perforated lines 86 and folding the abutments such that the central portions 88 of the abutments extend toward the center of the housing 12.

The scratch pad 14 is then placed between the first and second abutments 44, 46 of the first outwardly extending base member 62 and the first and second abutments 48, 50 of the second outwardly extending base member 64. The third outwardly extending base member 66 is then folded upwardly along the third fold line 72 to form a complete base.

The second section 56 is then folded over the first portion 54. Specifically, the first fold line 58 connecting the first side portion 24 to the first section 54 and the second fold line 60 connecting the first side portion 24 to the second section 56 are folded such that the second section 56 folds over the first section 54. The flaps 59 and 61 are then positioned behind the abutments 44 and 48. Before the second section 56 is connected to the first section 54, the central opening 20 in the second section 56 is created.

The central opening 20 is created by breaking a central perforated line 90, as well as a first lateral perforated line 92 and a second lateral perforated line 94, to create a first flap 96 and a second flap 98. The first flap 96 includes a central fold line 100 and an outer fold line 102. Similarly, the second flap 98 includes a central fold line 104 and an outer fold line 106. The first flap 96 and the second flap 98 are folded inwardly along their respective fold lines to create the triangular members shown in FIG. 3.

The second section 56 is then secured to the first section 54 by first folding the second section 56 over the first section 54, and positioning the central fold line 100 of the first flap adjacent 96 the first fold line 58 connecting the first side portion 24 to the first section 54 and positioning the central fold line 104 of the second flap 98 adjacent the third fold line 72 connecting the third outwardly extending base member 66 to the first section 54. The first flap 96 and the second flap 98 respectively form a first inwardly directed lip 40 and a second inwardly directed lip 42, which act to retain the play balls 16, 17 in a manner that will be discussed subsequently.

Once the second section 56 is positioned over the first section 54 and the first and second flaps 96, 98 are properly positioned, the first outwardly extending top member 74, the second outwardly extending top member 76 and the third outwardly extending top member 78 are respectively folded downwardly along first, second and third fold lines 80, 82, 84. The flaps 79 and 81 of the third outwardly extending top member 78 are then fold and positioned behind the abutments 46 and 50. Tab 108 of the first outwardly extending top member 74 is passed through an aperture 110 in the first fold line 68 of the first outwardly extending base member 62 to form the second side portion 26. Similarly, tab 112 of the second outwardly extending top member 76 is passed though an aperture 114 in the second fold line 70 of the second outwardly extending base member 64 to form the third side portion 28. Finally, first and second tabs 116, 118 of the third outwardly extending top member 78 are respectively passed though first and second apertures 120, 122 in the third fold line 72 of the second outwardly extending base member 66 to form the fourth side portion 30.

After the housing 12 is completely assembled the first and second play balls 16, 17 are forced within the first and second tracks 32, 36 formed on opposite sides of the scratch pad 14. The scratch pad 14, in combination with the first inwardly extending lip 40 and the second inwardly extending lip 42, act to retain the first and second play balls 16, 17 within the first and second tracks 32, 36. The completed housing 12 further includes first and second abutments 44, 46 at the second side portion 26 of the housing 12 and similar first and second abutments 48, 50 at the third side portion 28 of the housing 12.

An alternate embodiment of the present invention is shown in FIGS. 6, 7, 8, and 9. This embodiment provides a cat toy 10' having a housing 12' substantially identical to that shown in FIGS. 1–5 with the exception that a first central aperture 124 is provided on the third fold line 72' of the second outwardly extending base member 66' and a second central aperture 126 is provided on the first fold line 58' connecting the first side portion 24' to the first section 54'. The first central aperture 124 and the second central aperture 126 are sized to respectively receive outwardly extending tabs of a rocker member 128.

The form 130 of the rocker member 128 is shown in FIG. 9 and includes a rectangular central portion 132 divided into a first section 134 and second section 136 by a central fold line 138. The first section 134 includes tab members 140 and 142 formed at opposite ends thereof and second section 136 includes tab members 144 and 146 formed at opposite ends thereof. Adjacent tab members 140 and 144 form the first tab 148 which is sized to fit within the first central aperture 124, while adjacent tab members 142 and 146 form the second tab 150 which is sized to fit within the second central aperture 126.

When the rocker member 128 is attached to the housing 12', the housing 12' is able to rock back and forth on the central fold line 138. Specifically, the rocker member 128 is secured to the housing 12' by first folding the form 130 along the central fold line 138. The tab members 140, 142, 144 and 146 are respectively folded along fold lines 152, 154, 156, and 158 until they are perpendicular to the central portion 132. The form 130 is folded along fold line 138 until the tab members 140 and 144 overlap to form the first tab 148 and the tab members 142 and 146 overlap to form the second tab 150. The first tab 148 is then inserted within the first central aperture 124 and the second tab 150 is inserted within the second central aperture 126. The rocker member 128 should now be properly secured to the housing 12', which is then ready for use.

With the exception of the rocker member, the features of the cat toy 10' are the same as those disclosed with regard to FIGS. 1–5.

It should be understood that description above represents only one manner for assembling the housing, and the housing could be assembled in a variety of ways without departing from the spirit of the present invention. While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A cat toy, comprising:
   a housing having an opening permitting a cat to reach within the housing;
   a parallelogram shaped scratch pad positioned within the housing to create at least two tracks extending along the scratch pad; and
   at least one ball retained within each of the at least two tracks.

2. The toy according to claim 1, wherein the tracks are positioned on opposite sides of the scratch pad.

3. The toy according to claim 1, wherein the housing is made from a single piece of material.

4. The toy according to claim 3, wherein the material is cardboard.

5. The toy according to claim 1, wherein the housing includes a base, and a rocker member is secured to the base.

6. A cat toy, comprising:
   a housing including a opening permitting a cat to reach within the housing, wherein the housing is formed from a single piece of material that is originally a flat form and is folded into a final housing configuration;
   at least one amusement device retained within the housing; and
   wherein a scratch pad is positioned within the housing to create a first track for retaining a first play ball and a second track for retaining a second play ball.

7. The toy according to claim 6, wherein the housing is made from a flexible biodegradable material.

8. The toy according to claim 6, wherein the housing includes a top and a base, and the form includes a first section and a second section which respectively become the top and base of the housing.

9. The toy according to claim 8, wherein the housing includes a plurality of sides, and the form includes a plurality of outwardly extending members connected to the first section and the second section which become the sides of the housing.

10. The toy according to claim 6, wherein the housing includes a base, and a rocker member is secured to the base.

11. A method for making a cat toy, comprising the steps of:
    creating a form from a single piece of material;
    folding the form to create a housing having an opening and a base;
    permitting a cat to reach within the housing;
    securing a rocker member to the base of the housing; and
    positioning a cat amusement device within the housing.

12. The method according to claim 11, wherein the form is made from cardboard.

13. The method according to claim 11, wherein the form includes a first section and a second section, and the step of folding includes folding the form such that the first section and the second section respectively become a top and base of the housing.

14. The method according to claim 13, wherein the form includes a plurality of outwardly extending members connected to the first section and the second section, and the step of folding includes folding the form such that the outwardly extending members form side portions of the housing.

15. The method according to claim 16, wherein the form includes connecting means for holding the assembled housing together.

16. The method according to claim 11, wherein the rocker member includes tabs which are positioned within apertures in the base of the housing to secure the rocker member to the housing.

* * * * *